(12) United States Patent
Dietrich et al.

(10) Patent No.: US 10,882,291 B2
(45) Date of Patent: Jan. 5, 2021

(54) ADDITIVE-MANUFACTURING SYSTEMS, APPARATUSES AND METHODS

(71) Applicant: THE BOEING COMPANY, Chicago, IL (US)

(72) Inventors: David Michael Dietrich, Saint Peters, MO (US); Russell W. Cochran, Maryland Heights, MO (US); Daniel D. Bloch, Saint Peters, MO (US); Gary W. Coleman, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 668 days.

(21) Appl. No.: 15/688,686

(22) Filed: Aug. 28, 2017

(65) Prior Publication Data

US 2018/0001548 A1    Jan. 4, 2018

Related U.S. Application Data

(62) Division of application No. 13/949,946, filed on Jul. 24, 2013, now Pat. No. 9,751,260.

(51) Int. Cl.
*B29C 64/153* (2017.01)
*B32B 33/00* (2006.01)
(Continued)

(52) U.S. Cl.
CPC ............ *B32B 33/00* (2013.01); *B22F 3/1055* (2013.01); *B22F 3/24* (2013.01); *B29C 64/135* (2017.08);
(Continued)

(58) Field of Classification Search
None
See application file for complete search history.

(56) References Cited

U.S. PATENT DOCUMENTS

| 5,580,959 A | 12/1996 | Cook et al. |
| 5,837,960 A | 11/1998 | Lewis et al. |

(Continued)

FOREIGN PATENT DOCUMENTS

| CN | 101817121 A | 9/2010 |
| EP | 3001822 A2 | 4/2016 |

(Continued)

OTHER PUBLICATIONS

Canada Inteiiecutal Property Office Action for Application No. 2911666 dated Apr. 25, 2019 (Apr. 25, 2019).

(Continued)

*Primary Examiner* — Jeffrey M Wollschlager
*Assistant Examiner* — Armand Melendez
(74) *Attorney, Agent, or Firm* — Patterson + Sheridan, LLP

(57) ABSTRACT

In one aspect, A method of forming a product using an additive-manufacturing head includes forming a new layer of material of the product with the additive-manufacturing head. Forming the new layer of material includes depositing the new layer of material on an existing layer of material and melting the new layer of material so that the new layer of material is welded to the existing layer of material. The method also includes processing at least one of the new layer of material or the existing layer of material with a laser-emitting device, coupled to the additive-manufacturing head. Processing the at least one of the new layer of material or the existing layer of material with the laser-emitting device comprises smoothing a lateral surface of at least one of the new layer of material or the existing layer of material with a laser beam, emitted from the laser-emitting device.

20 Claims, 12 Drawing Sheets

(51) Int. Cl.

| | | |
|---|---|---|
| *B29C 64/135* | (2017.01) | |
| *B29C 64/268* | (2017.01) | |
| *B22F 3/105* | (2006.01) | |
| *B22F 3/24* | (2006.01) | |
| *B33Y 10/00* | (2015.01) | |
| *B33Y 30/00* | (2015.01) | |
| *B33Y 40/00* | (2020.01) | |
| *B29C 64/209* | (2017.01) | |
| *B29C 64/30* | (2017.01) | |
| *B29C 64/188* | (2017.01) | |
| *B23P 6/00* | (2006.01) | |
| *B29C 64/273* | (2017.01) | |
| *B29L 9/00* | (2006.01) | |

(52) U.S. Cl.
CPC .......... *B29C 64/188* (2017.08); *B29C 64/209* (2017.08); *B29C 64/268* (2017.08); *B29C 64/30* (2017.08); *B33Y 10/00* (2014.12); *B33Y 30/00* (2014.12); *B33Y 40/00* (2014.12); *B22F 2003/1056* (2013.01); *B22F 2003/245* (2013.01); *B22F 2003/247* (2013.01); *B23P 6/007* (2013.01); *B29C 64/153* (2017.08); *B29C 64/273* (2017.08); *B29L 2009/00* (2013.01); *Y02P 10/25* (2015.11)

(56) References Cited

U.S. PATENT DOCUMENTS

| | | |
|---|---|---|
| 6,030,199 A | 2/2000 | Tseng |
| 6,811,744 B2 | 11/2004 | Keicher et al. |
| 7,879,394 B1 | 2/2011 | Keicher et al. |
| 9,751,260 B2 | 9/2017 | Dietrich et al. |
| 2002/0041818 A1 | 4/2002 | Abe et al. |
| 2002/0145031 A1 | 10/2002 | Hirano et al. |
| 2003/0001313 A1* | 1/2003 | Krause .................... C04B 33/24 264/434 |
| 2004/0094728 A1 | 5/2004 | Herzog et al. |
| 2007/0272555 A1* | 11/2007 | Baird ..................... B23K 26/40 204/569 |
| 2013/0019768 A1 | 1/2013 | Mihashi et al. |
| 2013/0193618 A1* | 8/2013 | Miller .................... B29C 59/16 264/400 |
| 2013/0197683 A1 | 8/2013 | Zhang et al. |
| 2014/0334924 A1* | 11/2014 | Satzger ............. B23K 35/0244 415/208.1 |
| 2015/0048553 A1 | 2/2015 | Dietrich et al. |

FOREIGN PATENT DOCUMENTS

| | | |
|---|---|---|
| JP | H08156106 A | 6/1996 |
| JP | 2002115004 A | 1/2002 |
| JP | 2002301580 A | 10/2002 |
| JP | 2003048781 A | 2/2003 |
| JP | 200958233 A | 11/2009 |
| JP | 2011520652 A | 7/2011 |
| WO | 9710067 A1 | 3/1997 |
| WO | 2011127798 A1 | 10/2011 |
| WO | 2013092997 A1 | 6/2013 |
| WO | 2015012992 A2 | 1/2015 |

OTHER PUBLICATIONS

European Examination Report for Application No. 14 742 402.2-1103 dated Oct. 22, 2018.

* cited by examiner

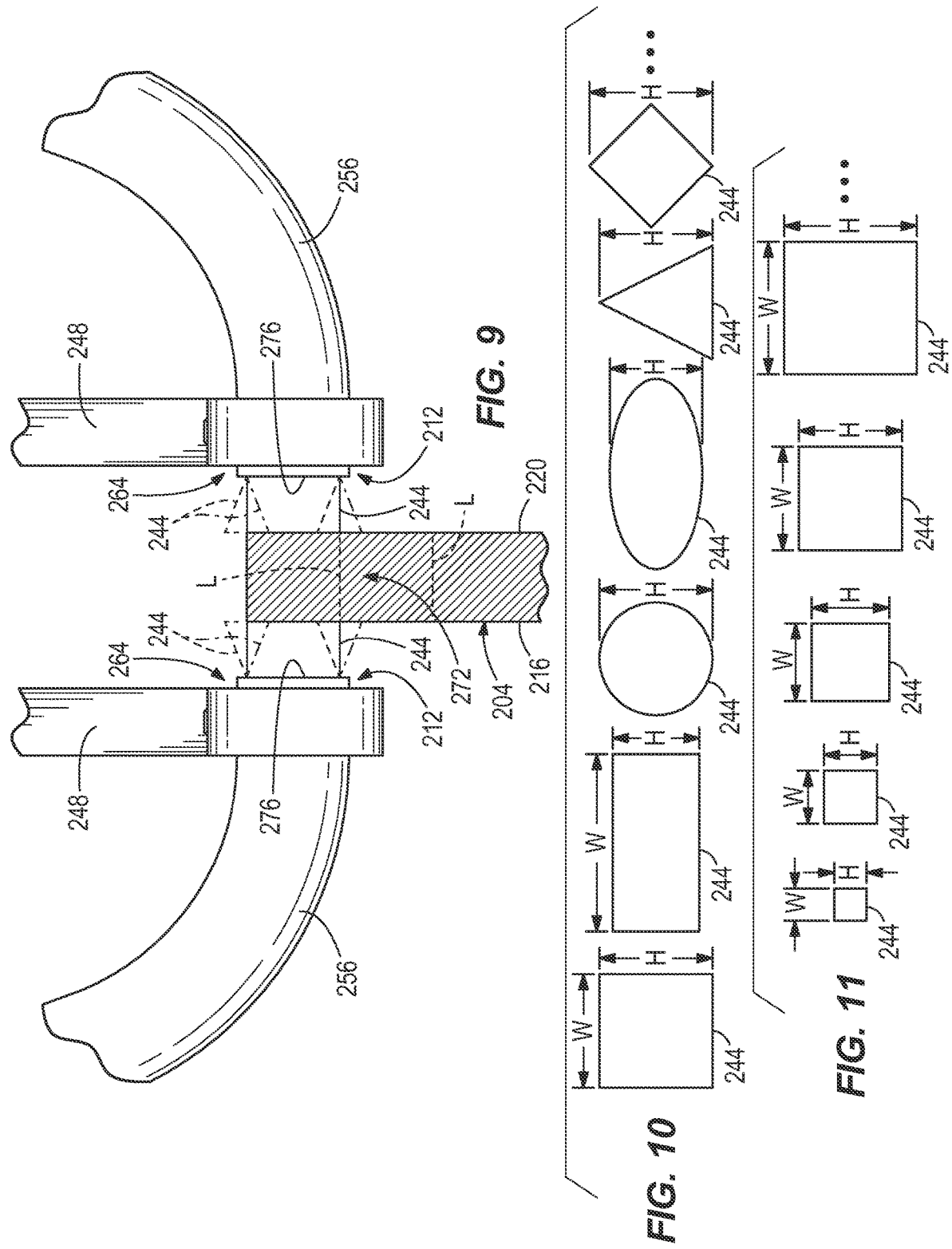

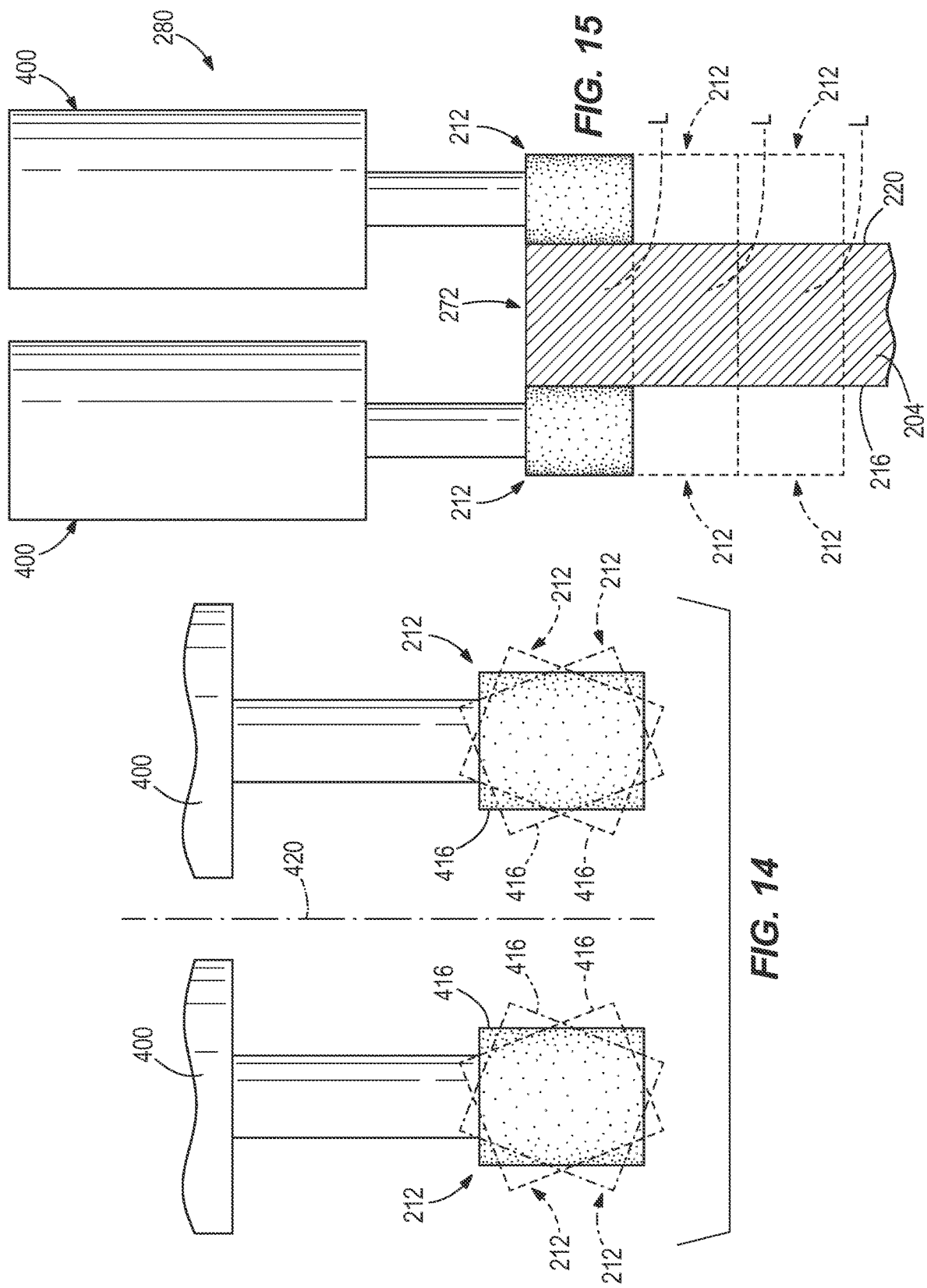

ADDITIVE-MANUFACTURING SYSTEMS, APPARATUSES AND METHODS

CROSS-REFERENCE TO RELATED APPLICATIONS

This application is a divisional of U.S. patent application Ser. No. 13/949,946, filed on Jul. 24, 2013, now issued as U.S. Pat. No. 9,751,260. The disclosure of the above application is incorporated herein by reference.

FIELD OF THE DISCLOSURE

The present disclosure generally relates to additive manufacturing and, more particularly, to processing surfaces of articles produced by additive manufacturing.

BACKGROUND

Additive manufacturing is utilized to fabricate 3-dimensional (3D) parts or products by adding layer-upon-layer of material. Additive manufacturing utilizes 3D-modeling (Computer-Aided Design or CAD) software, computer-controlled additive-manufacturing equipment, and raw materials in powder or liquid form. Additive manufacturing encompasses a wide variety of technologies and incorporates a wide variety of techniques, such as, for example, laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), 3D printing, rapid prototyping, direct digital manufacturing, layered manufacturing, and additive fabrication. Moreover, a variety of raw materials may be used in additive manufacturing to create products. Examples of such materials include plastics, metals, concrete, and glass.

One example of an additive-manufacturing system is a laser additive-manufacturing system. Laser additive manufacturing includes spraying or otherwise injecting a powder or a liquid into a focused beam of a high-power laser or *nexus* of a plurality of high-powered lasers under controlled atmospheric conditions, thereby creating a weld pool. The resulting deposits may then be used to build or repair articles for a wide variety of applications. The powder injected into the high-power laser beam may be comprised of a wide variety of materials that include, for example, metal, plastic, etc.

Articles formed by additive manufacturing may require surface processing to provide a more desirable product. One example of surface processing includes smoothing or otherwise reducing the roughness of the product's surface. Surfaces produced by additive manufacturing may have rough surface finishes, e.g., on the order of about 600-1000 microinches $R_a$. Such rough surfaces may have several undesirable effects. For example, parts having a rough surface finish have limited applications in cyclical-loading environments due to stress risers typically associated with high surface roughness. Additionally, rough surfaces may impede the use of cost-saving, non-destructive inspection systems because rough surface finishes generate high levels of noise in such systems. Examples of inspection systems include NDI, NDT, Die inspection, CAT scanning, X-ray, etc. When used on parts having relatively smooth surfaces, non-destructive inspection methods are widely recognized as cost-effective and accurate tools for identifying structural deficiencies in such parts.

To improve the surface finish of a part fabricated with additive-manufacturing equipment, separate post-processing steps must be undertaken at processing location using conventional surface-finishing equipment and techniques. However, due to the complexity of some parts, post-processing of surfaces thereof may be cumbersome, expensive, and time consuming. In addition, conventional post-processing surface-finishing methods may be ineffective for reducing the surface roughness of the interior surfaces of some complex parts, resulting in products with less than desirable properties.

SUMMARY

It would be desirable to provide additive-manufacturing systems and apparatuses therefor that process exterior and/or interior surfaces of manufactured parts in an efficient and cost-effective manner, and additionally are capable of processing surfaces of parts having complex configurations.

In one aspect of the disclosure, an additive-manufacturing system includes an additive-manufacturing head and a surface-processing device coupled to the additive-manufacturing head.

In another aspect of the disclosure, a surface-processing apparatus for an additive-manufacturing head includes a housing configured to be coupled to the additive-manufacturing head and a surface-processing device coupled to the housing.

In a further aspect of the disclosure, a method of forming a product using an additive-manufacturing head includes forming one or more layers of the product with the additive-manufacturing head and processing at least one of the one or more layers of the product with a surface-processing device coupled to the additive-manufacturing head.

It should be understood that the specific examples herein are intended for purposes of illustration only and are not intended to limit the scope of the present disclosure.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 9 is an enlarged view of one example of a pair of surface-processing devices configured to process surfaces of a product;

FIG. 10 illustrates examples of a plurality of shapes that the laser beam may comprise;

FIG. 11 illustrates a plurality of laser beams having a variety of different sizes;

FIG. 14 is an elevational view of a portion of the additive-manufacturing system shown in FIG. 12;

FIG. 15 is an elevational view of a portion of the additive-manufacturing system shown in FIG. 12;

DETAILED DESCRIPTION

Figure 1:
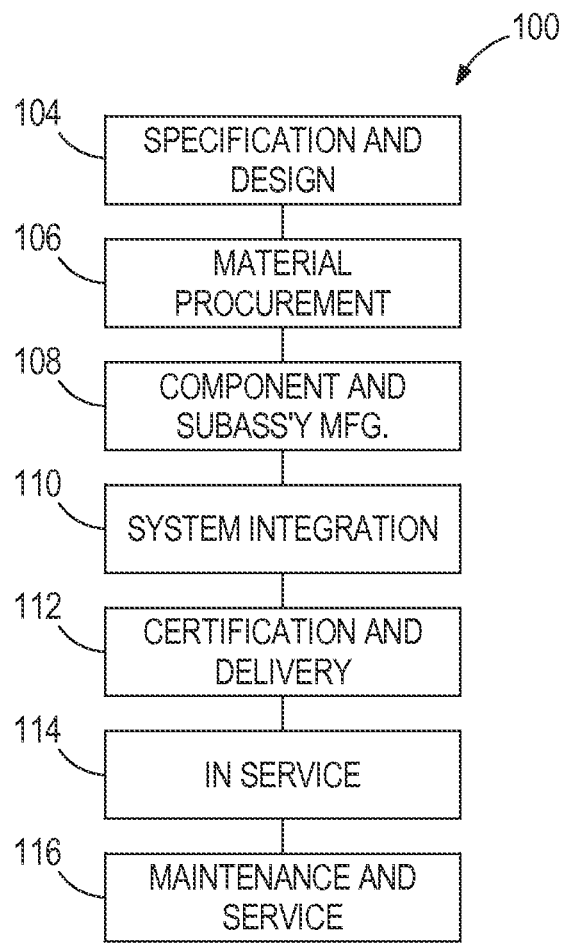
FIG. 1 is a flow diagram of an example of aircraft production and service methodology.
Figure 2:
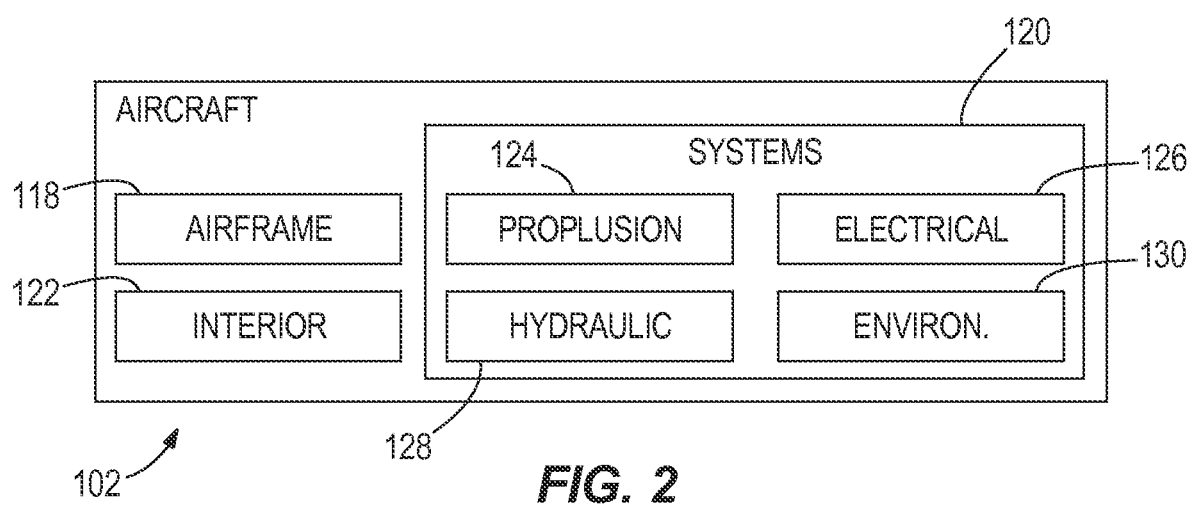
FIG. 2 is a block diagram of one example of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the present disclosure may be applied to other industries, such as the automotive industry or other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Referring now to FIGS. 3-11, an example of an additive-manufacturing system 200 is illustrated and is configured to form a part or product 204 (see FIG. 3), which may be utilized in a variety of industries including, but not limited to, aerospace, automotive, etc. The additive-manufacturing system 200 is configured to create a wide variety of products 204, having different shapes and sizes, as well as various levels of complexity. Products 204 may be made of a variety of materials including, but not limited to, metal, titanium alloys, nickel based alloys (Inconels), stainless and alloy steels, cobalt based alloys, plastic, polymers, ultem, nylon, etc.

The additive-manufacturing system 200, according to one or more aspects of the present disclosure, is capable of comprising a wide variety of additive-manufacturing equipment. In the illustrated system, the system 200 includes laser additive-manufacturing equipment. Other examples of a system of the present disclosure may incorporate alternative additive-manufacturing equipment such as, for example, fused-deposition modeling (FDM), multi-jet modeling (MJM), 3D-printing, rapid-prototyping, direct digital manufacturing, layered-manufacturing, and additive-fabrication equipment. The illustrated additive-manufacturing equipment and the recitation of other examples of additive-manufacturing equipment herein are not intended to be limiting upon the present disclosure in any way. Rather, the illustrated and described additive-manufacturing equipment is intended to demonstrate principles of the present disclosure. The additive-manufacturing system 200 is capable of including any type of additive-manufacturing equipment and all of such possibilities are intended to be within the spirit and scope of the present disclosure.

Figure 16:
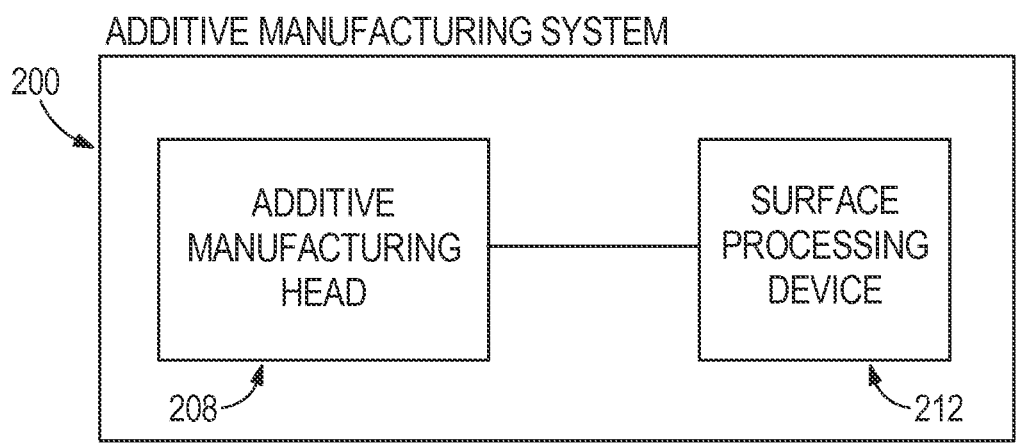
FIG. 16 is one example of a block diagram of a further example of an additive-manufacturing system.

Referring, for example, to FIG. 16, the additive-manufacturing system 200 includes an additive-manufacturing head 208 and a surface-processing device 212 coupled to the additive-manufacturing head 208. As shown, for example, in FIG. 3, the system 200 may include two surface-processing devices 212 for processing two surfaces 216, 220 of a product 204 formed by the additive-manufacturing head 208. Surfaces 216, 220 may be, for example, an interior and an exterior surface, respectively. As mentioned with reference to FIG. 16, the system 200 may also be configured to include a single surface-processing device 212 for treating a single surface of a product formed by the additive-manufacturing head 208. Still further, the system 200 may include more than two surface-processing devices 212 for treating any number of surfaces 216, 220 of a product 204 formed by the additive-manufacturing head 208. In the illustrated system 200, the two surface-processing devices 212 are substantially similar in structure and function. In other examples of the system 200, the system may include two or more surface-processing devices 212 and such devices may be different in structure and function. The description herein and the associated figures include two similar surface-processing devices 212, having similar structure and function. Such description and figures are not intended to be limiting, but are provided to demonstrate that many alternatives of the various aspects of the present disclosure are possible, with all of such alternatives intended to be within the spirit and scope of the present disclosure.

With reference to the illustrated system 200 in FIGS. 3-11, the two surface-processing devices 212 are similar in structure and function. Thus, only one of the surface-processing devices 212 will be described in more detail. The surface-processing device 212 is configured to smooth a surface of a product formed by the additive-manufacturing head 208. In other words, the surface-processing device 212 is configured to reduce the roughness of a surface of a product formed by the additive-manufacturing head 208. The surface-processing device 212 is movably coupled to the additive-manufacturing head 208. The surface-processing device 212 may also be rotatably coupled to the additive-manufacturing head 208. The surface-processing device 212 may be coupled to the additive-manufacturing head 208 in a variety of ways. The additive-manufacturing system 200 also includes a housing 224, rotatably coupled to the additive-manufacturing head 208. The surface-processing device 212 is coupled to the housing 224. The housing 224 is configured to rotate about a virtual longitudinal central axis 228 (FIG. 5), extending longitudinally and centrally through the additive-manufacturing head 208. As shown, for example, in FIG. 8, the system 200 may include means 328 for rotatably positioning the housing 224 relative to the additive-manufacturing head 208. In one aspect, the means 328 may be a servo-motor coupled to the housing 224. Referring, once again, to FIG. 3, the housing 224 may be rotatably coupled to the additive manufacturing head via, e.g., ball bearings 240 between the additive manufacturing head 208 and the housing 224. In one example, the means 328 may be coupled to the housing 224 for rotatably positioning the housing 224 relative to the manufacturing head 208.

Figure 3:
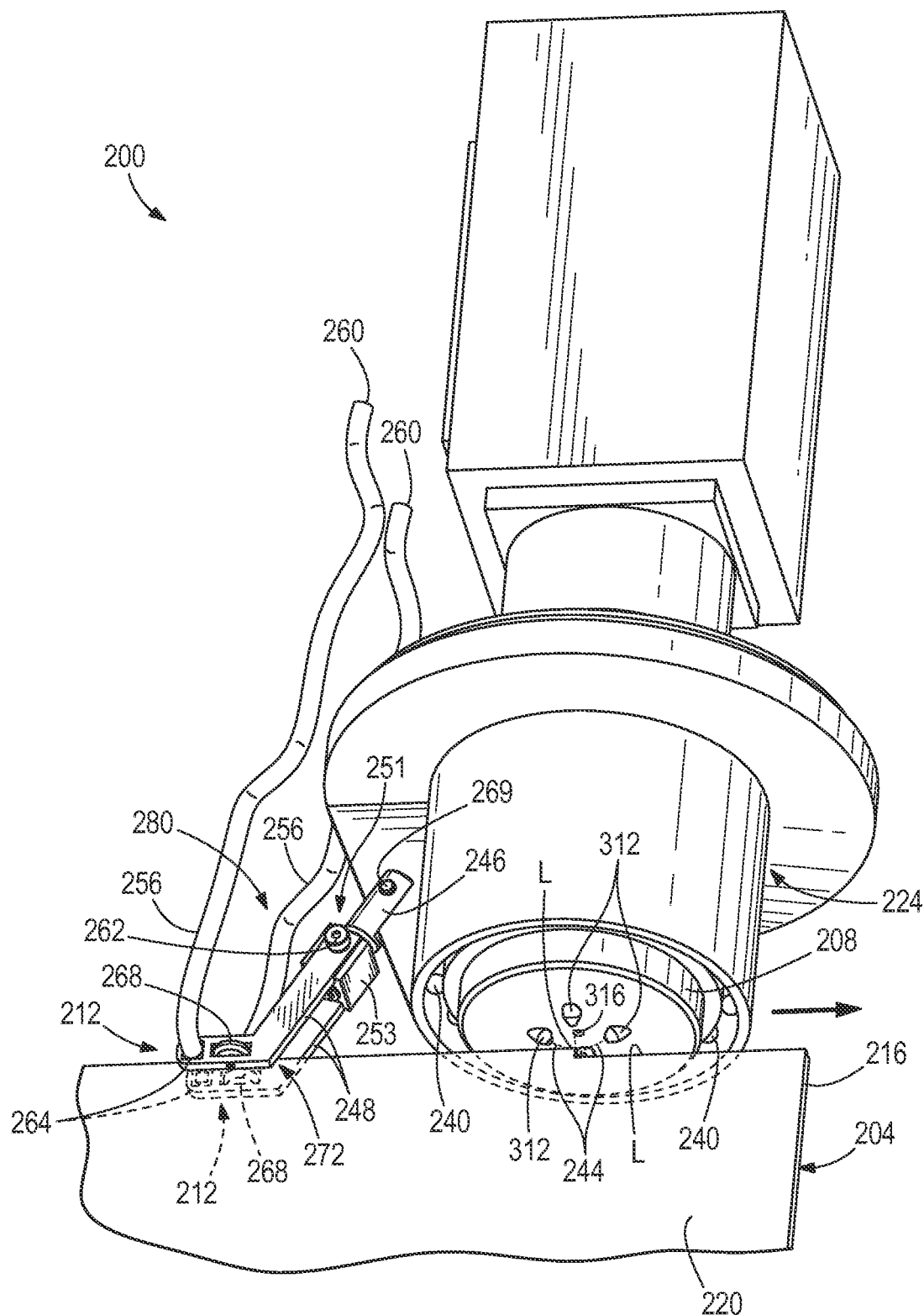
FIG. 3 is a bottom isometric view of one example of an additive-manufacturing system and a portion of one example of a part or product manufactured by the additive-manufacturing system.
Figure 4:
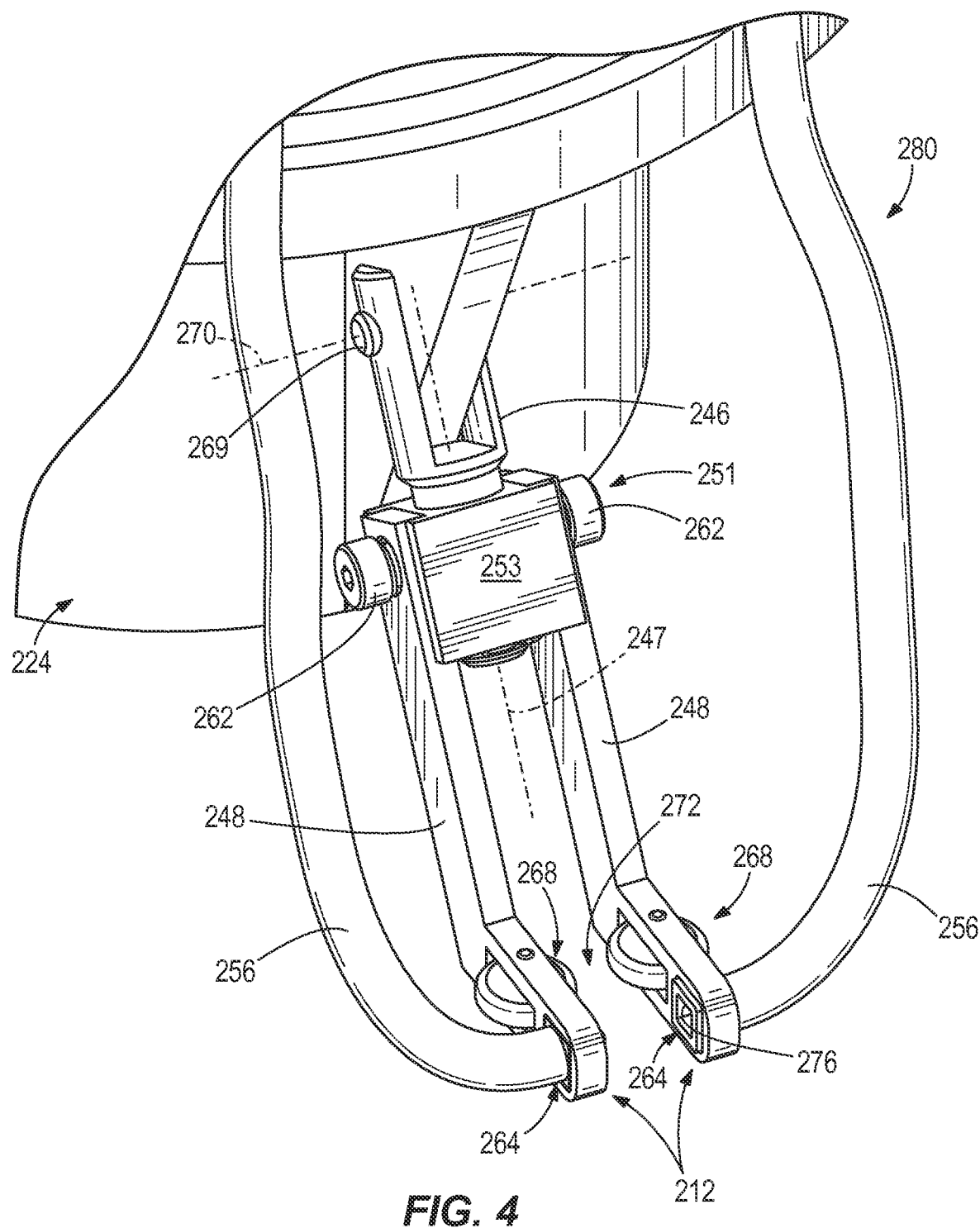
FIG. 4 is a top isometric view of a portion of the additive-manufacturing system shown in FIG. 3.
Figure 5:
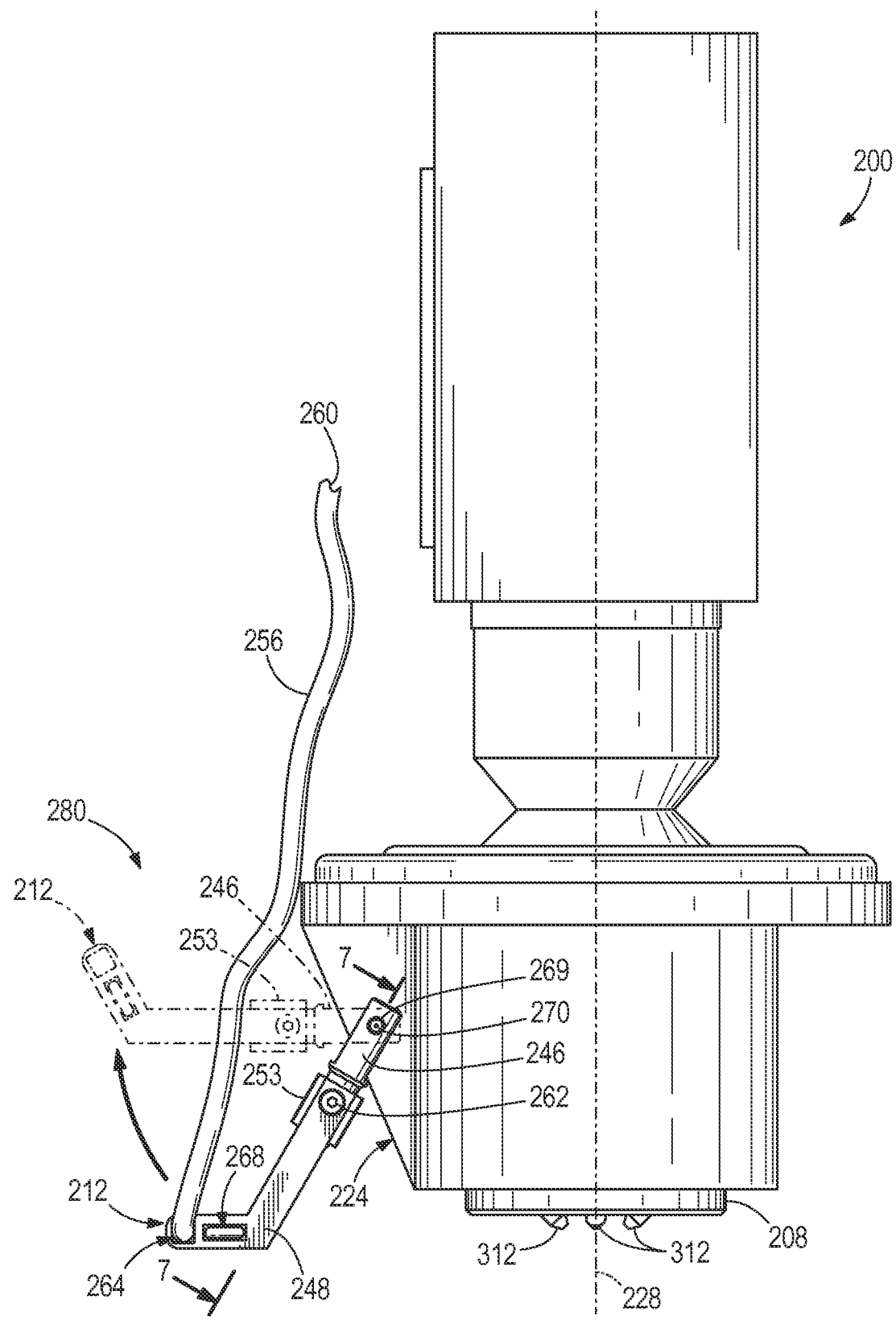
FIG. 5 is an elevational view of the additive-manufacturing system shown in FIG. 3.
Figure 6:
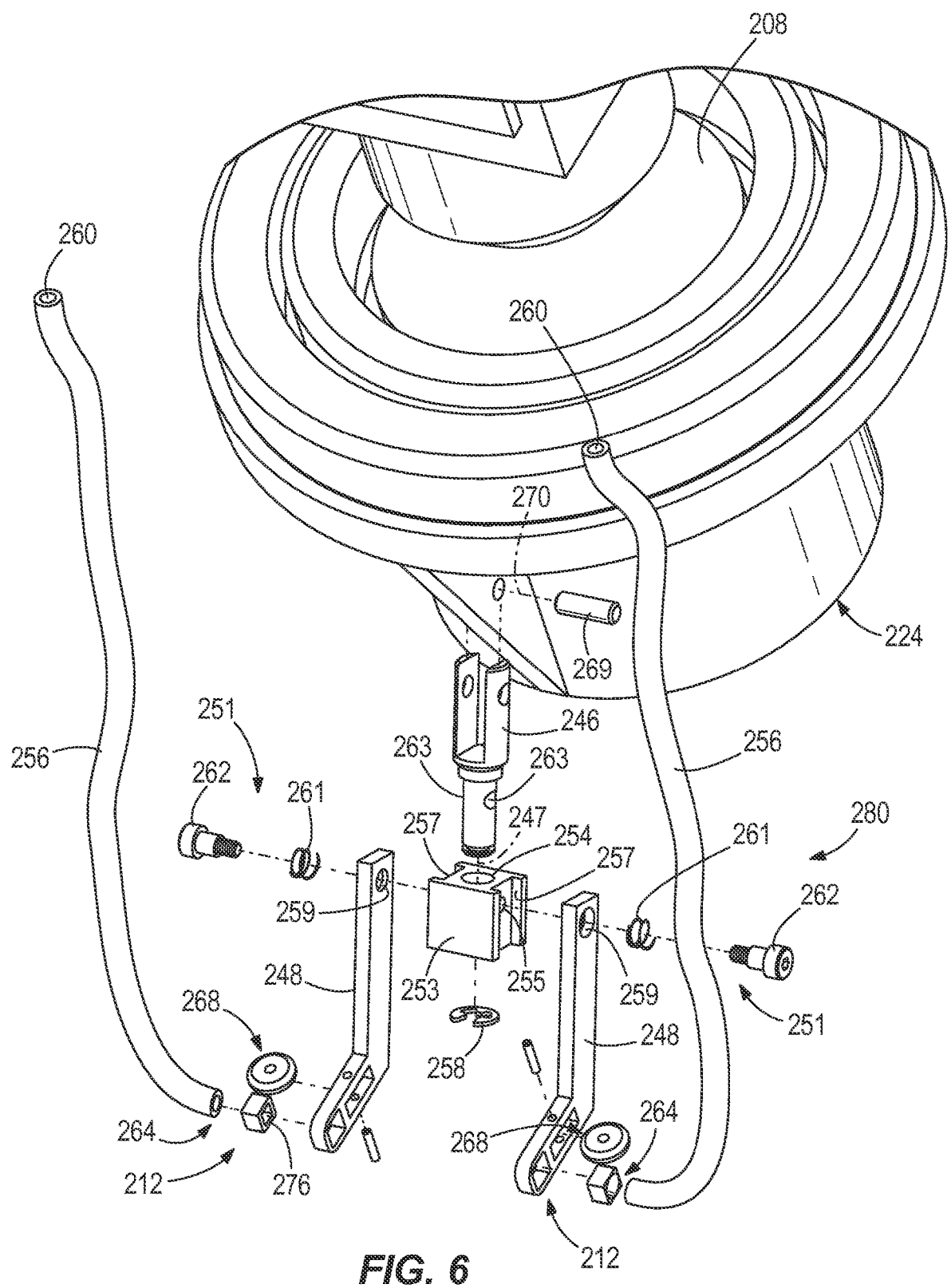
FIG. 6 is a partially exploded view of the additive-manufacturing system shown in FIG. 3.
Figure 7:
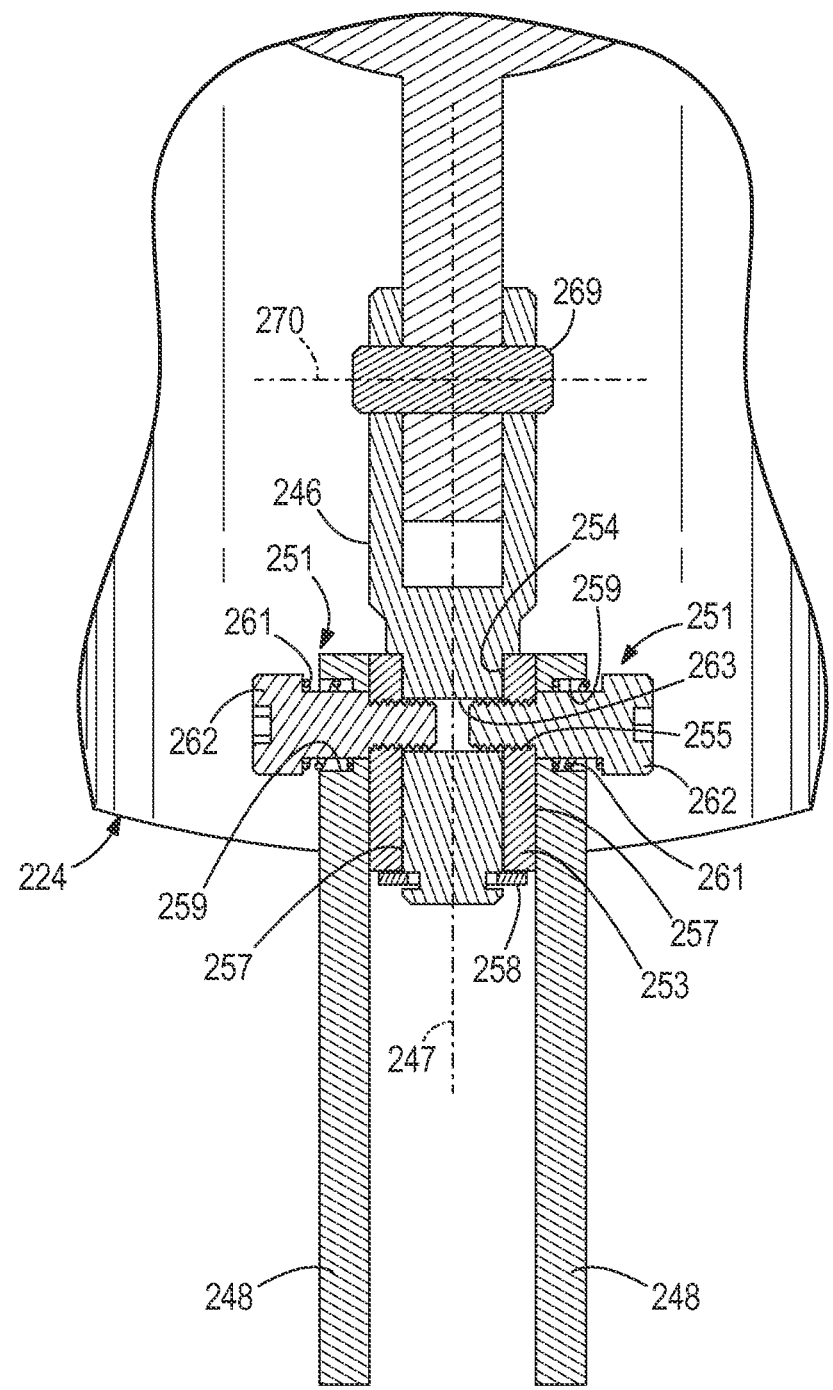
FIG. 7 is a cross-sectional view taken along line 7-7 in FIG. 5.

With reference to, for example, FIGS. 3 and 5, the surface-processing device 212 has a trailing orientation relative to the additive-manufacturing head 208 as the head 208 moves relative to the product 204 being formed. The means 328 rotatably positions the housing 224 relative to the additive-manufacturing head 208 so that the surface-processing device 212 is in the trailing orientation relative to the additive-manufacturing head 208. The surface-processing device 212 processes the product in-situ as the product is being formed by the additive-manufacturing head 208.

In the system 200 illustrated in FIGS. 3-11, the surface-processing device 212 is a laser-emitting device 212 configured to emit a laser beam 244 (FIG. 9). The system 200, illustrated, e.g., in FIG. 3, further includes support members 248, a laser energy source 252 (FIG. 8), and laser-delivery devices 256, including first ends 260, optically coupled to the laser energy source 252, and second ends 264, coupled to the support members 248. According to one aspect of the disclosure, the laser-emitting device 212 may be the second end 264 of the laser-delivery device 256. In one example, the second end 264 of the laser-delivery device 256 is configured to be generally polygonal in shape to emit the laser beam 244 having a generally polygonal cross-section.

In one example, the second end 264 of the laser-delivery device 256 is coupled to the laser-emitting device 212 that is polygonal in shape to emit the laser beam 244, having a generally polygonal cross-section. In one variant, the laser-emitting device 212 may be rectangular in shape to emit the laser beam 244, having a generally rectangular cross-section. Rectangular shapes include square shapes. In some aspects of the system 200, for example, when the laser-emitting device 212 is rectangular in shape, the laser beam 244 applies a constant quantity of energy to a surface of a product along the entire dimension H (see, for example, FIGS. 10 and 11) of the laser beam 244, as the laser beam impinges the surface being processed. The above-described configuration of the laser beam ensures that the surface of the product being impinged by the laser beam is evenly processed along the entire dimension H of the laser beam (e.g., evenly smoothed). Some examples of shapes of laser beams 244 that enable even processing of the product surface along the entire dimension H of the laser beam impinging the surface being processed include, but are not limited to, square, rectangular, or any other shape having an equal dimension W along its entire dimension H.

With reference to, for example, FIG. 10, in other examples of the system, the laser-emitting device 212 is configured to emit the laser beam 244 having a generally arcuately perimetered shape. In further examples of the system, the laser-emitting device 212 is configured to emit the laser beam 244 having a generally circular shape. When the system is configured to emit the laser beam 244 having a generally arcuately perimetered shape, such an arcuately perimetered shape may be any shape having an at least partially arcuate perimeter. Some examples of arcuately perimetered shapes include, but are not limited to, a circle, a semi-circle, a hemi-circle, an oval, or a non-uniform shape. It should be understood that the laser-emitting device 212 is capable of emitting laser beams 244 having any shape (see FIG. 10).

Figure 8:
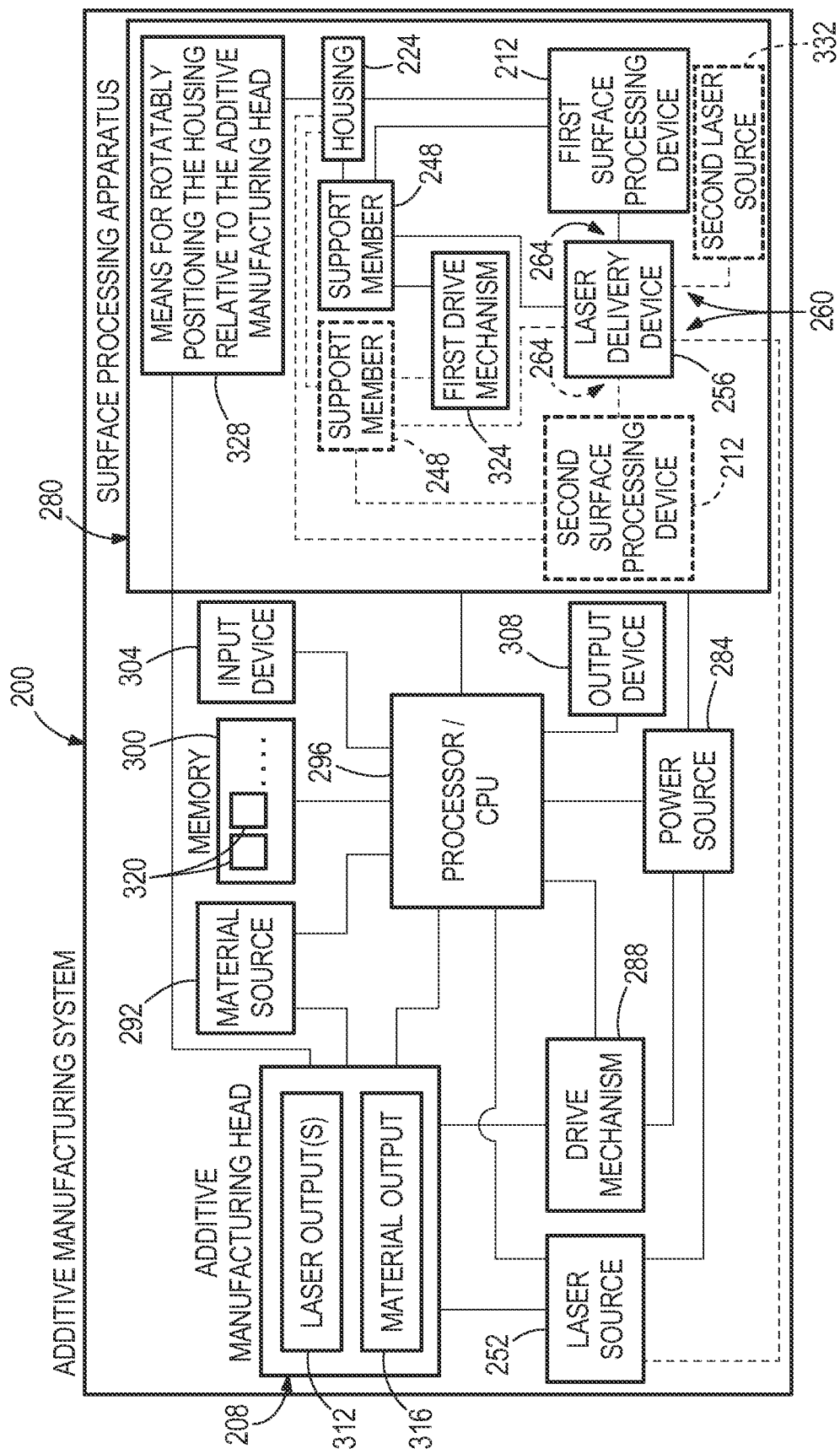
FIG. 8 is one example of a block diagram of the additive-manufacturing system shown in FIG. 3.
Figure 12:
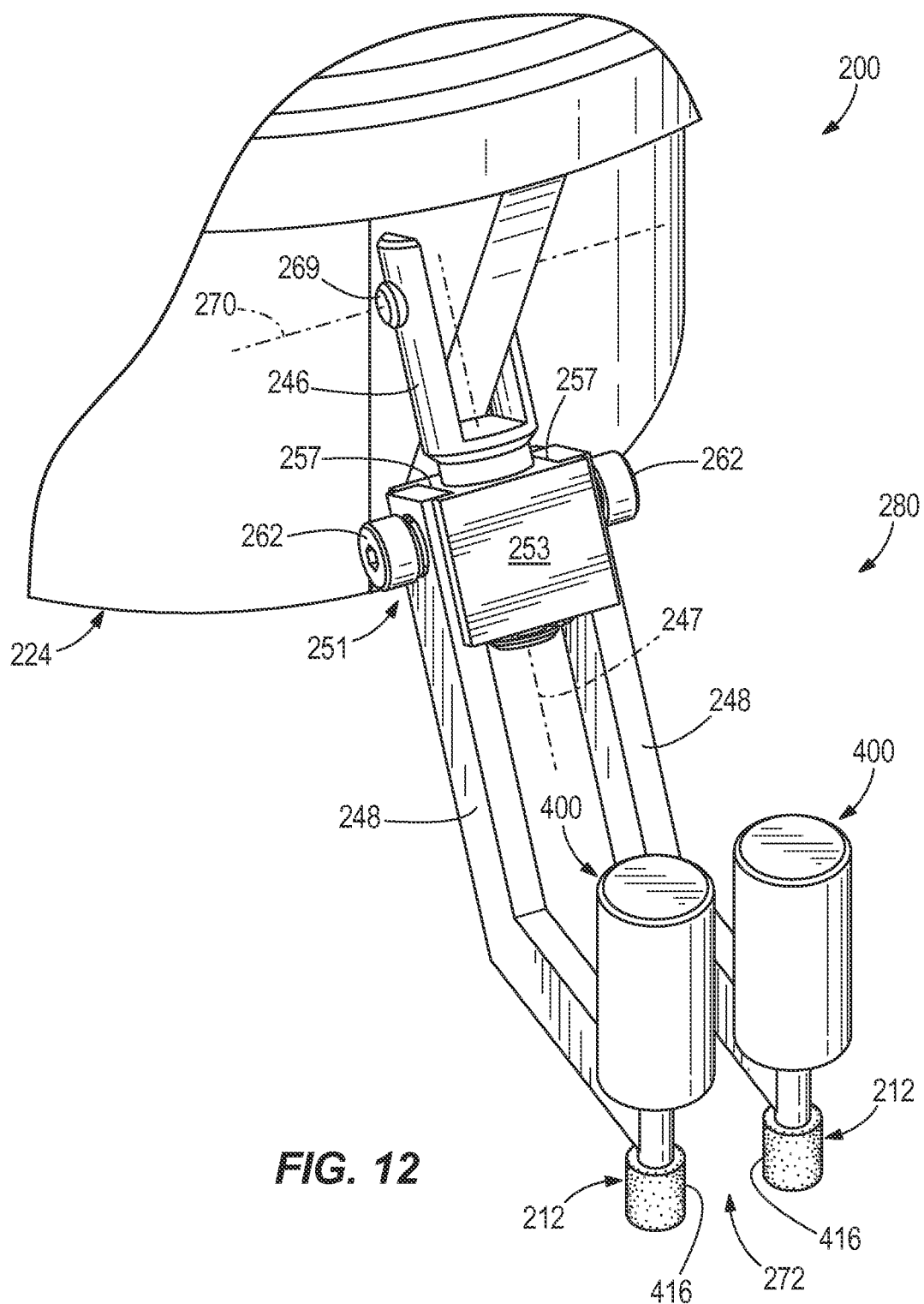
FIG. 12 is a top isometric view of another example of an additive-manufacturing system.

Referring, e.g., to FIG. 8, the laser-delivery device 256 is optically coupled to the laser source 252 and the laser-emitting device 212. In the illustrated system illustrated in FIGS. 3-9, the laser-delivery device 256 may be a fiber optic cable 256. As shown, e.g., in FIG. 3, the system 200 includes two laser-delivery devices 256. The system 200 may include any number of laser-delivery devices 256 to communicate the laser beam(s) 244 from the laser energy source 252 to the laser-emitting devices 212. In other examples, the laser-delivery device 256 may be other devices configured to optically communicate the laser beam 244 from the laser source 252 to a surface of the product formed by the additive-manufacturing head 208. Some examples include, but are not limited to, mirrors, other light and energy reflective members, light guides, etc. The laser-emitting device 212 is configured to be spaced-apart from a surface of the product formed by the additive-manufacturing head 208. The additive-manufacturing system 200 further includes a guide member 268 configured to engage a product formed by the additive-manufacturing head 208 to orient the surface-processing device 212 relative to the product. The guide member 268 spaces the surface-processing device 212 a distance away from the surface of the product. In the illustrated system 200, the guide member 268 is a guide roller 268. In other examples of systems, the guide member 268 may be other types of guide members such as, for example, a surface-tracking shoe that engages and slides against the surface of the product, or any other type of guide member.

The additive-manufacturing head 208 is configured to form a product from a plurality of layers L (see, for example, FIGS. 3 and 9). The surface-processing device 212 is configured to process the product formed by the additive-manufacturing head 208 in a variety of ways. In one aspect, the surface-processing device 212 is configured to process one of the plurality of layers L (see, for example, FIG. 9). In another aspect, the surface-processing device 212 is configured to contemporaneously process two or more of the plurality of layers L. The surface-processing device 212 may be configured to contemporaneously process a number of layers L. With reference to FIG. 11, various sizes of rectangular-shaped cross-sections of the laser beam 244 are shown to illustrate the ability to process a number of the layers L of a product formed by an additive-manufacturing head 208. The laser beam 244 of any shape may have a variety of different sizes to process various numbers of layers of a product.

As indicated above, the surface-processing device 212 is configured to move relative to the additive-manufacturing head 208. With reference to FIG. 5, the surface-processing device 212 is configured to move relative to the additive-manufacturing head 208 between a first (or active) position, in which the surface-processing device 212 is capable of processing the product formed by the additive-manufacturing head 208, and a second (or idle) position, in which the surface-processing device 212 is not capable of processing the product. In the illustrated system 200, the surface-processing device 212 is rotatably coupled to the housing 224 and the surface-processing device 212 rotates between the first position and the second position. With continued reference to FIG. 5 and additional reference to FIGS. 3, 4, 6, and 7, the system 200 includes a shaft 269, having a virtual longitudinal central axis 270. The surface-processing device 212 is configured to rotate about the shaft 269 and the associated longitudinal central axis 270 between the first position and the second position. Alternatively, the surface-processing device 212 may be coupled to the additive-manufacturing head 208 using any number of different methodologies and may move between the first position and the second position in a variety of different ways.

With continued reference to FIGS. 3-7, the system 200 also includes a coupling member 246 and a support member 248. The coupling member 246 is coupled to and between the housing 224 and the support member 248, and the support member 248 supports the surface-processing device 212. The support member 248 is configured to rotate relative to the coupling member 246 about a virtual longitudinal central axis 247 (FIG. 6) of the coupling member 246. The system 200 further includes a base 253 defining a first aperture 254 for receiving the coupling member 246, a second aperture 255 generally orthogonal to the first aperture 254, and a pair of recesses or channels 257 defined in opposing surfaces of the base for receiving respective support members 248. A snap ring 258 couples the base 253 to the coupling member 246. Ends of the support members 248 include counter-bored apertures 259 therein. The system 200 also includes means 251 for adjusting forces applied to surfaces of a product by the guide members 268. The guide members 268 are preloaded against the surfaces of the product to maintain constant spacing of the surface-processing devices 212 relative to the surfaces of the product. In one example, the means 251 for adjusting preload include biasing members 261, such as coil springs, positioned within the counter-bored apertures 259 and fasteners 262 extending through the biasing members 261 and the counter-bored apertures 259. The fasteners 262 thread into the second aperture 255 of the base 253. The coupling member 246 defines an opening or slots 263 therein to allow rotation of the base 253 relative to the coupling member 246 about the axis 247. Thus, the base 253, the biasing members 261, the fasteners 262, the support members 248, and the surface-processing devices 212 rotate as a unit relative to the coupling member 246 about the axis 247. Fasteners 262 can be tightened or loosened to adjust the force on the guide members 268 and their preload against the surfaces 216, 220 of the product 204 by compressing the springs 261 or by allowing the springs to relax, respectively. The opening or slots 263 may be defined a portion of the way through the coupling member 246 or may be defined all the way through the coupling member 246. Defining the opening or slots 263 either partially through or completely through the coupling member 246 may provide clearance between the fasteners 262 and the coupling member 246 and facilitate rotation of the fasteners 262 relative to the coupling member 246.

In one aspect, the surface-processing device 212 is configured to rotate about at least one axis. The at least one axis may be any one or more of the axes 228, 247, 270 (see FIGS. 5-7). In another aspect, the surface-processing device 212 is configured to rotate about at least two axes. The at least two axes may be any two or more of the axes 228, 247, 270 (see FIGS. 5-7). In a further aspect, the surface-processing device 212 is configured to rotate about three axes. The three axis include all three axes 228, 247, 270 (see FIGS. 5-7).

Referring now to FIGS. 3-9, the system 200 is configured to include multiple surface-processing devices 212, as indicated above. In one aspect of the system 200, the surface-processing device 212 comprises a first surface-processing device 212 and a second surface-processing device 212, spaced-apart from the first surface-processing device 212. As shown, e.g., in FIG. 4, a space 272 is provided between the first and second surface-processing devices 212. The first surface-processing device 212 and the second surface-processing device 212 are in a trailing orientation relative to the additive-manufacturing head 208. Thus, a portion of the product 204 (e.g., FIG. 9) formed by the additive-manufacturing head 208 is positioned in the space 272 between the first and second surface-processing devices 212. In one aspect, the portion of the product positioned in the space 272 is at least one layer L of the product 204. In another aspect, the portion of the product positioned in the space 272 is at least two layers L of the product contemporaneously. In a further aspect, the portion of the product positioned in the space 272 is a plurality of layers L of the product, contemporaneously.

With continued reference to FIGS. 3-9, the system 200 includes a guide member 268, as indicated above. The guide member 268 may be a first guide member 268 and the system 200 may further include a second guide member 268 opposing the first guide member 268. The first guide member 268 and the second guide member 268 are configured to engage a product formed by the additive-manufacturing head 208 to provide spacing of the first surface-processing device 212 and the second surface-processing device 212 relative to the product. The first guide member 268 is configured to engage an exterior surface 220 of the product 204 and the second guide member 268 is configured to engage an interior surface 216 of the product 204. In the illustrated system 200, the first guide member 268 and the second guide member 268 are guide rollers 268. In other examples, the first and second guide members 268 may be any type of guide members such as, for example, surface tracking shoes that engage and slide against surface of the product. The first surface-processing device 212 is configured to process a first surface of a product formed by the additive-manufacturing head 208 and the second surface-processing device 212 is configured to process a second surface of the product. The first surface is an exterior surface 220 of the product and the second surface is an interior surface 216 of the product.

The surface-processing devices 212 may be a variety of different types of processing devices 212. In examples where the system 200 includes a single surface-processing device 212, the surface-processing device 212 includes an aperture 276 configured to emit electromagnetic energy (see FIGS. 4, 6, and 9). In examples where the system 200 includes two or more surface-processing devices 212, the aperture is a first aperture 276, and the surface-processing device 212 further includes a second aperture 276 opposing the first aperture 276 and configured to emit electromagnetic energy (see FIGS. 4, 6, and 9). In one example, the first and second apertures 276 may have generally the same shape. In another example, the first aperture may have a first shape and the second aperture may have a second shape different than the first shape. In one aspect, the first aperture 276 may be the second end 264 of a first laser-delivery device 256 and the second aperture 276 may be the second end 264 of a second laser-delivery device 256.

With continued reference to FIGS. 3-11 and particular reference to FIG. 8, an example of a block diagram of the system 200 is illustrated. The additive-manufacturing system 200 includes the additive-manufacturing head 208, a surface-processing apparatus 280, a power source 284, a laser source 252, a drive mechanism 288, a material source 292, a processor and/or central processing unit (CPU) 296, memory 300, input device 304, and an output device 308. The system 200 is not limited to including only the above-identified components, arranged as shown in FIG. 8 and having the features and functionality described herein. Rather, the system 200 is capable of including more, fewer, or different components and is capable of having more, fewer, or different features and functionality, and all of such possibilities are intended to be within the spirit and scope of the present disclosure.

With continued reference to FIG. 8, the power source 284 is configured to provide power to the components of the system 200, as required. The power source 284 may be a single power source or may be comprised of a plurality of power sources working together to provide the necessary power output. Alternatively, the plurality of power sources may operate independently and may individually supply power to particular components of the system 200. The power source 284 may be either an AC or a DC power source, or may utilize a combination of AC and DC.

The laser source 252 generates the laser beam 244 and transmits it to one or more laser outputs 312 (e.g., FIG. 5) of the additive-manufacturing head 208 for emission. The laser beam 244, emitted from the one or more laser outputs 312, is concentrated into a *nexus* or convergence. The material source 292 supplies raw material to the additive-manufacturing head 208 that will be used to manufacture the product 204. The raw material may be any type of material having any type of form (e.g., powder, liquid, solid, etc.). The material is ejected from one or more material outputs 316 provided in the additive-manufacturing head 208. The material outputs 316 may comprise a variety of configurations such as, for example, apertures, nozzles, etc. In the illustrated example, the additive-manufacturing head 208 includes a single material output 316, which is comprised of an aperture 316 aligned with the *nexus* or convergence of the plurality of laser outputs 312. Raw material is released from the material output 316 and enters the *nexus* or convergence of the laser outputs 312, where the material is melted to form a weld pool. As the additive-manufacturing head 208 advances relative to the product being formed, the melted material forms a new layer L of the product 204. The melted material begins to cool and harden once the material is out of the weld pool.

With additional reference to FIG. 8, the processor or CPU 296 communicates with and/or controls various components in the system 200. The memory 300 may be a computer-readable memory medium 300 and is configured to store data required for operation of the system 200. Computer-readable memory medium 300 is any medium which can be used to store information which can later be accessed by the processor 296. Computer-readable memory medium 300 may include computer memory and data storage devices. Computer memory may be a fast-access memory and may be used to run program instructions executable by the processor 296. Computer memory may include random access memory (RAM), flash memory, and read-only memory (ROM). Data storage devices may be physical devices and may be used to store any information or computer program which may be accessed by the processor 296, such as an operating system, computer programs, program modules, and program data. Data storage devices and their associated computer-readable memory media provide storage of computer-readable instructions, data structures, program modules, and other data for the system. Data storage devices may include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

In some aspects of the system 200, the memory 300 includes data packets 320 comprised of data required for controlled operation of the system 200. One data packet 320 may contain data required for control of the additive-manufacturing head 208 and another data packet 320 may contain data required for control of the surface-processing apparatus 280. The surface-processing apparatus 280 is coupled to and in a trailing orientation to the additive-manufacturing head 208. The surface-processing apparatus 280 processes one or more surfaces of the product after the material has been deposited by the additive-manufacturing head 208. The processor 296 communicates with the memory 300 to retrieve the necessary data for controlling the orientation of the surface-processing apparatus 280 relative to the additive-manufacturing head 208.

The subject matter of the present disclosure will be described with reference to acts and symbolic representations of operations that are performed by one or more computers or computer systems, unless indicated otherwise. As such, it will be understood that such acts and operations, which are at times referred to as being computer-executed, include the manipulation by the processor 296 of the system 200 via electrical signals representing data in a structured form. This manipulation transforms the data or maintains it at specific locations in the memory 300 of the system 200, which reconfigures or otherwise alters the operation of the system 200 in a manner well understood by those skilled in the art. The data structures where data is maintained are physical locations of the memory 300 that have particular properties defined by the format of the data. However, although the subject matter of the application is being described in the foregoing context, it is not meant to be limiting, as those skilled in the art will appreciate, in that some of the acts and operations described herein may also be implemented in hardware, software, and/or firmware and/or some combination thereof.

With further reference to FIG. 8, the input device 304 allows users to input data into the system 200. The input device 304 may have a wide variety of configurations, all of which are intended to be within the spirit and scope of the present disclosure. For example, the input device 304 may be a keyboard, a keypad, a touch-screen display, an actuator, a switch, a dial, a slide mechanism, or any other type of mechanical, electrical, or electromechanical device configured to allow a user to input information and/or control the system 200, at least in part. Moreover, the system 200 may include a plurality of input devices 304.

With continued reference to FIG. 8, the output device 308 outputs information from the system 200 that may be perceived by a user. The output device 308 may have a wide variety of configurations, all of which are intended to be within the spirit and scope of the present disclosure. For example, the output device 308 may be display, a monitor, an alphanumeric indicator, an illumination device (e.g., a light bulb, an LED, an array of LEDs, etc.), a printer or other image-producing device, or any other type of mechanical, electrical, or electromechanical device configured to output information from the system 200 in a form that is perceivable by a user. Moreover, the system 200 may include a plurality of output devices 308.

The drive mechanism 288 is coupled to the additive-manufacturing head 208 and is controllable by the processor 296 to move the additive-manufacturing head 208 in a desired manner. Alternatively, the additive-manufacturing head 208 may remain stationary and the product manufactured by the system 200 may be supported on a base or table that may be moved by the drive mechanism 288 relative to the head 208. In either instance, the drive mechanism 288 provides the desired relative translational movement between the product 204 being formed and the additive-manufacturing system 200. In some aspects of the system 200, the drive mechanism 288 comprises a single drive mechanism for performing all the necessary relative translational movement. In other aspects of the system 200, the drive mechanism 288 comprises a plurality of cooperating drive mechanisms.

The surface-processing apparatus 280 is configured to process one or more surfaces of a product formed by the additive-manufacturing head 208. The surface-processing apparatus 280 trails behind the additive-manufacturing head 208 to process the material deposited by the additive-manufacturing head 208. The surface-processing apparatus 280 may process the surfaces of the product being formed in a variety of ways. For example, in the illustrated system 200, the surface-processing apparatus 280 may smooth or otherwise reduce the roughness of the surfaces of the product. This example of surface processing is not intended to be limiting upon the present disclosure. Rather, the system 200 is capable of performing any type of surface-processing, such as, for example, coating or heat treating, and all of such possibilities are intended to be within the spirit and scope of the present disclosure. The surface-processing apparatus 280 may treat a portion of the product 204 as the product is being formed, operating in situ. In some aspects of the disclosure, the surface-processing apparatus 280 may process a single layer L of material deposited by the additive-manufacturing head 208. In other aspects, the surface-processing apparatus 280 may process two or more layers L of material deposited by the additive-manufacturing head 208. The surface-processing apparatus 280 may also be configured to treat a plurality of layers L of the product formed by the additive-manufacturing head 208.

Referring now to FIGS. 3-11, in the illustrated system 200, the surface-processing apparatus 280 includes a first surface-processing device 212 and a second processing device 212. The first and second processing devices 212 may include a wide variety of types of processing devices and, as a result, may process the surfaces of the product formed by the additive-manufacturing head 208 in a variety of ways. In the illustrated system 200, the first and second surface-processing devices 212 are laser-emitting devices 212. The surface-processing apparatus 280 also includes a first drive mechanism 324 configured to move the first and second surface-processing devices 212 between a first or active position, in which the first and second processing devices 212 are configured to process the surfaces of the product formed by the additive-manufacturing head 208 (see, for example, solid lines FIG. 5), and a second or idle position, in which the first and second surface-processing devices 212 are not configured to process the surfaces of the product (as illustrated, for example, with the dashed lines in FIG. 5). In one example, the first drive mechanism 324 is a servo-motor or a stepper-motor. In another example, the first drive mechanism may be air driven (e.g., rotary, linear, etc.), hydraulically driven (e.g., rotary, linear, etc.), or electromagnetically driven (e.g., solenoid).

In some aspects of the disclosure, the system 200 may comprise only a single surface-processing device 212 to process a single surface of the product formed by the additive-manufacturing head 208. Thus, the second surface-processing device 212 is shown in dashed lines in FIG. 8 to illustrate an alternative aspect of the present disclosure.

Referring, for example, to FIG. 8, the surface-processing apparatus 280 further includes the means 328 for rotatably positioning the housing 224 of the surface-processing apparatus 280 relative to the additive-manufacturing head 208. In some aspects, the means 328 may be an open-frame servo motor coupled to the additive-manufacturing head 208. In other aspects, the means 328 may be other types of drive mechanisms and may have other configurations.

The surface-processing device 212 may also include a second laser source 332 configured to create a laser beam 244 to be optically communicated to the first and second surface-processing devices 212. In this example, the second laser source 332 would provide the laser beam 244 for the surface-processing operation and the laser source 252 would provide the laser beam 244 for the additive-manufacturing head 208.

As shown in FIG. 8, the lines connecting the various components of the system 200 may represent a wide variety of interactions between the various components of the system 200. Moreover, such interactions between the components may occur in either direction or may simultaneously occur in both directions. The interactions may include, but are not limited to, transfer of electrical energy or power for purposes of powering a component, communication of electrical data between components, transfer of physical matter between components, a mechanical coupling, connection, attachment, or engagement between components, or any other type of interaction that may occur in the additive-manufacturing system 200, in one or more aspects thereof. The dashed lines connecting the various components of the system 200 may represent interactions similar in function and purpose to those represented by the solid lines, however, interactions represented by the dashed lines relate to alternative aspects of the disclosure. Likewise, components represented in dashed lines represent alternative aspects of the present disclosure.

With reference to, for example, FIGS. 3 and 8, in one example, a surface-processing apparatus 280 for an additive-manufacturing head 208 is provided. The surface-processing apparatus 280 includes a housing, 224 configured to be coupled to the additive-manufacturing head 208, and a surface-processing device 212, coupled to the housing 224. The surface-processing device 212 includes one of a mechanical device or an optical device. The surface-processing device 212 is configured to move relative to the additive-manufacturing head 208. In one aspect, the housing 224 is rotatably coupled to the additive-manufacturing head 208. In such an aspect, the surface-processing apparatus 280 further includes means 328 for rotatably positioning the housing 224 relative to the additive-manufacturing head 208.

As shown, for example, in FIGS. 3 and 5, the surface-processing device 212 has a trailing orientation relative to the additive-manufacturing head 208. The surface-processing device 212 is configured to be spaced apart from a surface of a product 204 formed by the additive-manufacturing head 208.

Referring now to FIGS. 3-9, in one aspect, the surface-processing device 212 is configured to emit a laser beam 244. The surface-processing apparatus 280 further includes a laser energy source 252, 332 and a laser-delivery device 256 coupled to the laser energy source 252, 332 to deliver the laser beam 244 from the laser energy source 252, 332 to a surface of a product formed by the additive-manufacturing head 208. The surface-processing device 212 also includes a support member 248 coupled to the housing 224, and the laser-delivery device 256 includes a first end 260 coupled to the laser energy source 252, 332 and a second end 264 coupled to the support member 248. In one aspect, the second end 264 of the laser-delivery device 256 is generally polygonal in shape to emit the laser beam 244 having a generally polygonal cross-section. In another aspect, the second end 264 of the laser-delivery device 256 is generally rectangular in shape to emit the laser beam 244 having a generally rectangular cross-section. In a further aspect, the laser-delivery device 256 is configured to emit the laser beam 244 having a cross-section with a generally arcuate perimeter. In one aspect, the laser-delivery device is a fiber optic cable 256.

The surface-processing device 212 is configured to engage a product formed by the additive-manufacturing head 208. In one aspect, the surface-processing device 212 is configured to optically engage a product formed by the additive-manufacturing head 208.

In one aspect, the additive-manufacturing head 208 is configured to form a product from a plurality of layers L (see FIG. 3), and the surface-processing device 212 is configured to process at least one of the plurality of layers L (see FIGS. 3 and 9). In another aspect, the additive-manufacturing head 208 is configured to form a product from a plurality of layers L, and the surface-processing device 212 is configured to contemporaneously process two or more of the plurality of layers L.

The surface-processing device 212 is configured to move relative to the additive-manufacturing head 208 between the first (active) position, in which the surface-processing device 212 is capable of processing a product formed by the additive-manufacturing head 208 (see, for example, solid lines in FIG. 5), and the second (idle) position, in which the surface-processing device 212 is not capable of processing the product (see, for example, dashed lines in FIG. 5). In one aspect, the surface-processing device 212 is rotatably coupled to the housing 224 and rotates between the first position and the second position. The surface-processing apparatus 280 also includes the coupling member 246 and the support member 248. The coupling member 246 is coupled to and between the housing 224 and the support member 248, and the support member 248 supports the surface-processing device 212. In one aspect, the support member 248 is configured to rotate relative to the coupling member 246. The support member 248 is configured to rotate about the longitudinal central axis of the coupling member 246.

In some examples, the system 200 includes multiple surface-processing devices 212. In such aspects, the first surface-processing device 212 and the second surface-processing device 212 are spaced-apart from the first surface-processing device 212. Both the first and second surface-processing devices 212 are in a trailing orientation relative to the additive-manufacturing head 208. The first surface-processing device 212 is configured to process a first surface of the product formed by the additive-manufacturing head 208 and the second surface-processing device 212 is configured to process the second surface of the product. In one aspect, the first surface is an exterior surface 220 of the product 204 and the second surface is an interior surface 216 of the product 204.

The surface-processing apparatus 280 further includes the guide member 268. The guide member 268 is configured to engage a product formed by the additive-manufacturing head 208 and is configured to orient the surface-processing device 212 relative to the product. The guide member 268 is configured to space the surface-processing device 212 a distance away from the surface of the product. In one aspect, the guide member 268 is a guide roller. In one aspect, the surface-processing device 212 is an optical device.

The surface-processing device 212 is configured to smooth a surface of a product formed by the additive-manufacturing head 208.

In one aspect, the surface-processing device 212 is configured to rotate about at least one axis 228, 247, 270. In another aspect, the surface-processing device 212 is configured to rotate about at least two axes 228, 247, 270. In a further aspect, the surface-processing device 212 is configured to rotate about three axes 228, 247, 270.

In one example of the system 200, the surface-processing device 212 includes the aperture 276 configured to emit electromagnetic energy.

The following description pertains to examples of methods and processes associated with the examples of additive-manufacturing systems described and illustrated herein. While particular steps and functionality of the additive-manufacturing systems are described herein, such steps and functionality are merely examples and are not intended to be limiting. Rather, the additive-manufacturing systems are intended to include more, fewer, or different steps and functionality, and all of such possibilities are intended to be within the spirit and scope of the present disclosure.

In one aspect, a method of forming a product using an additive-manufacturing head 208 is provided. The method includes forming one or more layers L of the product with the additive-manufacturing head 208 and processing at least one of the one or more layers L of the product with a surface-processing device 212, coupled to the additive-manufacturing head 208. In one example, the step of processing the at least one of the one or more layers L of the product further includes smoothing the at least one of the one or more layers L of the product. In one variant, the step of smoothing the at least one of the one or more layers L also includes smoothing the at least one of the one or more layers L along at least one of an interior surface or an exterior surface of the product. In one alternative, the step of smoothing the at least one of the one or more layers L along the at least one of the interior surface or the exterior surface further includes melting a portion of the at least one of the one or more layers L. In another example, the step of smoothing the at least one of the one or more layers L also includes smoothing the at least one of the one or more layers L along both an interior surface and an exterior surface of the product. In another variant, the step of smoothing the at least one of the one or more layers L along both of the interior surface and the exterior surface also includes melting a portion of the at least one of the one or more layers L.

In another alternative, the method further includes moving the surface-processing device 212 relative to the additive-manufacturing head 208.

In a further example, the method further includes rotating the surface-processing device 212 relative to the additive-manufacturing head 208.

In a further variant, the method further includes positioning the surface-processing device 212 in a trailing orientation relative to the additive-manufacturing head 208.

In a further alternative, the method further includes spacing the surface-processing device 212 from a surface of the product.

In still another example, the surface-processing device 212 is a laser-emitting device 212, and the step of processing the at least one of the one or more layers L further includes melting a portion thereof with a laser beam 244. In still another variant, the method also includes delivering the laser beam 244 to the at least one of the one or more layers L with a laser-delivery device 256 coupled to a laser energy source 252.

In still another alternative, the step of processing the at least one of the one or more layers L includes contemporaneously processing two or more of the layers L.

In still a further example, the method further includes moving the surface-processing device 212 relative to the additive-manufacturing head 208 between a first (active) position, in which the surface-processing device 212 is capable of processing at least one of the one or more layers L of the product (see, for example, solid lines in FIG. 5), and a second (idle) position, in which the surface-processing device 212 is not capable of processing at least one of the one or more layers L of the product (see, for example, dashed lines in FIG. 5).

In still a further variant, the surface-processing device 212 includes a first surface-processing device 212 and a second surface-processing device 212, and the step of processing further includes processing the at least one of the one or more layers L with the first surface-processing device 212 and the second surface-processing device 212. In still a further alternative, the first processing device 212 and the second processing device 212 are spaced-apart from one another and in a trailing orientation relative to the additive-manufacturing head 208. In another example, the step of processing the at least one of the one or more layers L further includes processing a first surface of the product with the first surface-processing device 212 and processing a second surface of the product with the second surface-processing device 212. In another variant, the first surface is an exterior surface of the product and the second surface is an interior surface of the product.

In another alternative, the method further includes spacing the surface-processing device 212 away from the product. In a further example, the step of spacing the surface-processing device 212 away from the product is achieved using a guide member 268 engaging a surface of the product.

In a further variant, a vehicle, such as an aircraft, a marine vessel, a land vehicle, etc., includes a product manufactured by a method of forming a product using the additive-manufacturing head 208. In a further alternative, the method includes forming one or more layers L of the product with the additive-manufacturing head 208, and processing at least one of the one or more layers L of the product with the surface-processing device 212 coupled to the additive-manufacturing head 208.

Referring now to FIGS. 12-15, another example of the system 200 is illustrated. The system 200 illustrated in FIGS. 12-15 includes some similar structure and functionality to the system 200 illustrated in FIGS. 3-11. The following description relates to at least some of the differences between the two illustrative systems.

Figure 13:
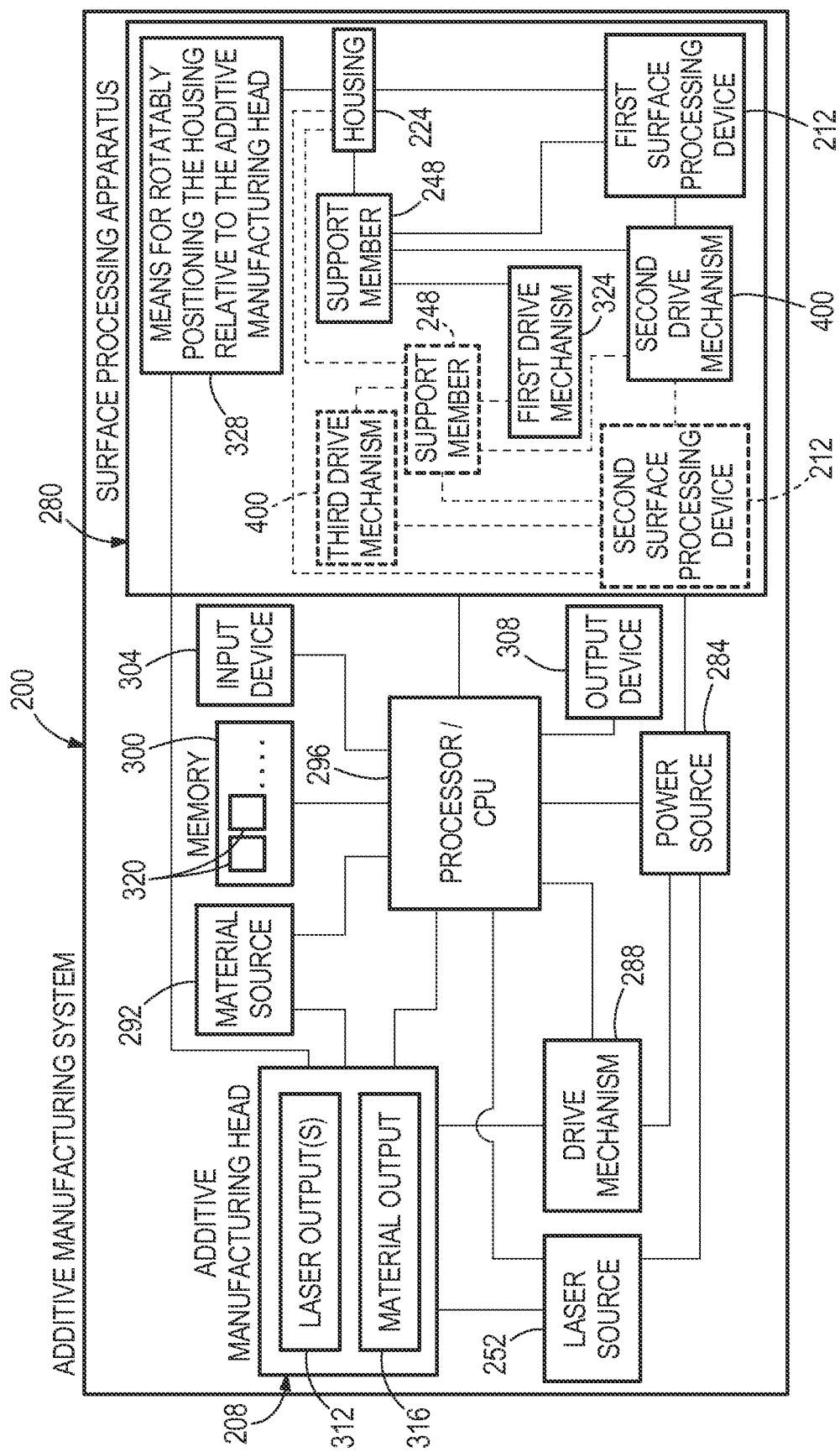
FIG. 13 is one example of a block diagram of the additive-manufacturing system shown in FIG. 12.

With reference to FIGS. 12-15, one aspect of the additive-manufacturing system 200 includes the additive-manufacturing head 208 (FIGS. 3, 5 and 12) and the surface-processing device 212, e.g., an abrasive cutter 212 (FIG. 12), coupled to the additive-manufacturing head 208. In one example, the surface-processing device 212 is configured to engage a product 204 (FIG. 15), formed by the additive-manufacturing head 208. In one variant, as illustrated in FIG. 13, the system 200 further includes a first drive mechanism 324, means 328 for rotatably positioning the housing 224 relative to the additive manufacturing head 208, and a second drive mechanism 400, operatively coupled to the abrasive cutter 212 to rotate the abrasive cutter 212. In one alternative, the system 200 also includes a housing 224 and a support member 248 coupled to the housing 224. In a further example, the housing 224 is coupled to the additive-manufacturing head 208, and the second drive mechanism 400 and the abrasive cutter 212 are supported by the support member 248.

As stated above, in one variant, the surface-processing device 212 is the abrasive cutter 212. In the illustrated system 200, the surface-processing device includes the first abrasive cutter 212 and the second abrasive cutter 212, spaced-apart from one another. The first abrasive cutter 212 and the second abrasive cutter 212 respectively include the second drive mechanism 400 and the third drive mechanism 400, each configured to rotate one of the first and second abrasive cutters 212. The abrasive cutters may rotate in the same or opposite directions. Alternatively, a single drive mechanism, e.g., the second drive mechanism 400, may be used to rotate both abrasive cutters. The abrasive cutters 212 are supported by a support member 248, which is rotatably coupled to a coupling member 246. The support member 248 and the abrasive cutters 212 rotate about a coupling-member axis 247, extending longitudinally through a center of the coupling member 246. The coupling member 246 is rotatably coupled to the housing 224, e.g., by a shaft 269. An axis 270 extends longitudinally through a center of the shaft 269 and the coupling member 246, support members 248, and abrasive cutters 212 rotate about the axis 270. The abrasive cutters 212 are configured to engage and process a first surface and a second surface of a product formed by the additive-manufacturing head 208. The first surface may be an interior surface of the product and the second surface may be an exterior surface of the product, or vice versa.

With particular reference to FIG. 13, the system 200 may include similar features and components to the system 200 illustrated in FIGS. 3-11. For example, the system 200 illustrated in FIG. 13 includes a similar additive-manufacturing head 208, laser source 252, drive mechanism 288, material source 292, power source 284, processor or CPU 296, memory 300, input device 304 and output device 308. At least some of the differences between the system 200 illustrated in FIG. 8 and the system 200 illustrated in FIG. 13 include, in one example, a second drive mechanism 400, configured to rotate both the first and second surface-processing devices 212 to process surfaces of a product formed by the additive-manufacturing head 208. In one variant, the first and second surface-processing devices 212 are first and second abrasive cutters 212 and the second drive mechanism 400 rotates the abrasive cutters 212 to abrade or cut the surfaces of the product. In one alternative, the second drive mechanism 400 is a servo-motor or a stepper-motor. In another example, the second drive mechanism 400 may be an air motor, a hydraulic motor, or an electric motor (e.g., AC or DC). In another variant, the system 200 may only include a single surface-processing device 212 to process a single surface of a product. Thus, the second surface-processing device 212 is shown in dashed lines in FIG. 13 to demonstrate that it may be optional.

In another alternative, the system 200 may also include a third drive mechanism 400 configured to rotate the second surface-processing device 212 to process a surface of the product. In this alternative, the second drive mechanism 400 rotates the first surface-processing device 212 to process a first surface of the product and the third drive mechanism 400 rotates the second surface-processing device 212 to process a second surface of the product. In a further example, the third drive mechanism 400 is a servo-motor or a stepper-motor. In a further variant, the third drive mechanism 400 may be an air motor, a hydraulic motor, or an electric motor (e.g., AC or DC).

In still another example, the system 200 also includes the first drive mechanism 324 that is configured to rotate the first and second surface-processing devices 212 between a first or processing position, in which the first and second surface-processing devices 212 are configured to process surfaces of a product, and a second or idle position, in which the first and second surface-processing devices 212 are not configured to process surfaces of the product. In still another variant, the system 200 may only include a single surface-processing device 212 to process a single surface of a product.

In still another alternative, the system 200 may further include means 328 for rotatably positioning the housing 224 relative to the additive manufacturing head 208. The means 328 ensures that the surface-processing apparatus 280 properly trails behind the additive-manufacturing head 208 to process the desired portion of the product. In still a further example, the means 328 may be an open-frame servo motor coupled to the additive-manufacturing head 208.

The lines connecting the various components of the system 200 may represent a wide variety of interactions between the various components of the system 200. Moreover, such interactions between the components may travel in either direction or may allow interactions to travel in both directions. The interactions may include, but are not limited to, conveyance of electrical energy or power for purposes of powering a component, communication of electrical data between components, conveyance of physical matter between components, a mechanical coupling, connection, attachment, or engagement between components, or any other type of interaction that may occur in the additive-manufacturing system 200, in one or more aspects thereof. The dashed lines connecting the various components of the system 200 may be similar in function and purpose as the solid lines, however, the dashed lines represent that the interaction may be optional.

With reference to FIG. 14, for example, the abrasive cutters 212 are configured to be oriented at different angles. In one example, the abrasive cutters 212 are oriented in a vertical manner (see solid lines), such that abrading surfaces 416 of the abrasive cutters 212 are generally vertical and parallel to a vertical axis 420. In one variant, the abrasive cutters 212 are oriented obliquely (see phantom and dashed lines—two different orientations) such that abrading surfaces 416 of the abrasive cutters 212 are generally transverse to the vertical axis 420.

Referring now to FIG. 15, the abrasive cutters 212 may, for example, have different dimensions to process or abrade various portions of a product formed by the additive-manufacturing head 208. In one example, the abrasive cutters 212 may be sized to process or abrade a single layer L of the product (see solid lines). In one variant, the abrasive cutters 212 may be sized to simultaneously process or abrade two or more layers L of the product (see dashed lines).

Referring again to FIGS. 12-15, in one example, the surface-processing device 212 is configured to physically engage a product formed by the additive-manufacturing head 208. In such an example, the surface-processing device may be the abrasive cutter 212, and the surface-processing apparatus 280 may further include the drive mechanism 400 coupled to the abrasive cutter 212 for rotating the abrasive cutter 212. In one variant, the surface-processing apparatus 280 further includes the housing 224 and the support member 248, coupled to the housing 224. In one alternative, the housing 224 may be configured to couple to the additive-manufacturing head 208, and the drive mechanism 400 and the abrasive cutter 212 may be supported by the support member 248.

The following description pertains to examples of methods and processes associated with the examples of additive-manufacturing systems described and illustrated in FIGS. 12-15. While particular steps and functionality of the additive-manufacturing systems are described herein, such steps and functionality are merely examples and are not intended to be limiting. Rather, the additive-manufacturing systems are intended to include more, fewer, and different steps and functionality, and all of such possibilities are intended to be within the spirit and scope of the present disclosure.

In one aspect, a method of forming a product using the additive-manufacturing head 208 is provided. The method includes forming one or more layers L of the product 204 with the additive-manufacturing head 208 and processing at least one of the one or more layers L of the product with the surface-processing device 212, coupled to the additive-manufacturing head 208. In one example, the step of processing the at least one of the one or more layers L of the product also includes smoothing the at least one of the one or more layers L of the product. In one variant, the step of smoothing the at least one of the one or more layers L further includes smoothing the at least one of the one or more layers L along at least one of an interior surface or an exterior surface of the product. In one alternative, the step of smoothing the at least one of the one or more layers L along the at least one of the interior surface or the exterior surface also includes abrading a portion of the at least one of the one or more layers L. In another example, the step of smoothing the at least one of the one or more layers L along both the interior surface and the exterior surface also includes abrading a portion of the at least one of the one or more layers L.

In another variant, the step of processing the at least one of the one or more layers L of the product further includes engaging the surface-processing device 212 with the at least one of the one or more layers L of the product. In another alternative, the surface-processing device 212 is the abrasive cutter 212, and the step of engaging the at least one of the one or more layers L of the product further includes abrading a portion of the at least one of the one or more layers L of the product with the abrasive cutter 212 configured to be rotated by the drive mechanism 400. In a further example, the method further includes supporting the drive mechanism 400 and the abrasive cutter 212 with the support member 248. The support member 248 is coupled to the housing 224 and the housing 224 is configured to be coupled to the additive-manufacturing head 208.

Referring now to FIG. 16, an aspect of the additive manufacturing system 200 is illustrated. In one example, the additive-manufacturing system 200 includes the additive-manufacturing head 208 and the surface-processing device 212, coupled to the additive-manufacturing head 208.

Figure 17:
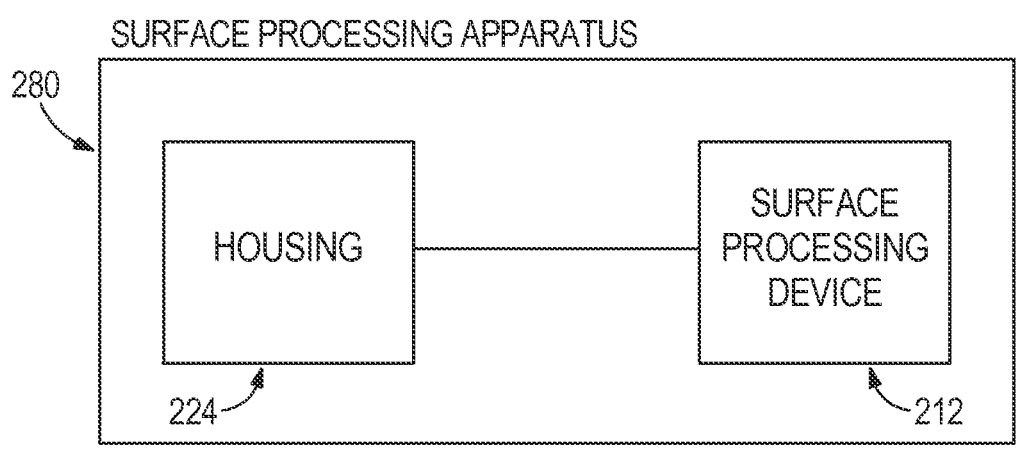
FIG. 17 is one example of a block diagram of another example of a surface processing apparatus.

With reference to FIG. 17, an aspect of the surface processing apparatus 280 is illustrated. In one variant, the surface-processing apparatus includes the housing 224 configured to be coupled to the additive-manufacturing head 208 and also includes the surface-processing device 212, coupled to the housing 224.

As realized herein, a variety of different aspects, examples, variants and alternatives of additive-manufacturing systems, apparatuses and methods are disclosed herein that include a variety of components, features, and functionality. It should be understood that the various aspects, examples, variants and alternatives of systems, apparatuses and methods disclosed herein are capable of including any of the components, features, and functionality of any of the other aspects, examples, variants and alternatives of systems, apparatuses, and methods disclosed herein in any combination, and all of such possibilities are intended to be within the spirit and scope of the present disclosure.

It should be understood that the terms aspect, example, variant and alternative may be used interchangeably herein and the various uses of such terms is not intended to limit the present disclosure in any manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

What is claimed is:

1. A method of forming a product using an additive-manufacturing head, the method comprising steps of:
    forming a new layer of material of the product with the additive-manufacturing head, wherein the step of forming the new layer of material comprises depositing the new layer of material on an existing layer of material and melting the new layer of material so that the new layer of material is welded to the existing layer of material; and
    processing at least one of the new layer of material or the existing layer of material with a laser-emitting device, coupled to the additive-manufacturing head, wherein the step of processing the at least one of the new layer of material or the existing layer of material with the laser-emitting device comprises smoothing a lateral surface of at least one of the new layer of material or the existing layer of material with a laser beam, emitted from the laser-emitting device.

2. The method of claim 1, wherein smoothing the at least one of the new layer of material or the existing layer of material comprises smoothing at least one of an interior surface or an exterior surface of the product.

3. The method of claim 2, wherein smoothing the at least one of the interior surface or the exterior surface comprises melting a portion of the at least one of the new layer of material or the existing layer of material.

4. The method of claim 2, further comprising moving the laser-emitting device relative to the additive-manufacturing head.

5. The method of claim 1, further comprising rotating the laser-emitting device relative to the additive-manufacturing head.

6. The method of claim 1, further comprising positioning the laser-emitting device in a trailing orientation relative to the additive-manufacturing head.

7. The method of claim 1, further comprising spacing the laser-emitting device a predetermined distance from the product using a guide member.

8. The method of claim 7, wherein the guide member is a guide roller.

9. The method of claim 1, wherein the laser beam emitted from the laser-emitting device is directed to the at least one of the new layer of material or the existing layer of material using a mirror.

10. The method of claim 9, wherein the laser beam has a polygonal cross-section.

11. The method of claim 10, further comprising spacing the laser-emitting device a predetermined distance from the product using a guide member.

12. A method of forming a product using an additive-manufacturing head, the method comprising steps of:
    forming a new layer of material on an existing layer of material of the product with the additive-manufacturing head, wherein the step of forming the new layer of material comprises depositing the new layer of material on the existing layer of material and melting the new layer of material with a first laser beam so that the new layer of material is welded to the existing layer of material; and
    processing at least one of the new layer of material or the existing layer of material with a surface-processing device coupled to the additive-manufacturing head, the surface-processing device comprising a second laser beam.

13. The method of claim 12, further comprising moving the surface-processing device relative to the additive-manufacturing head.

14. The method of claim 12, further comprising rotating the surface-processing device relative to the additive-manufacturing head.

15. The method of claim 12, further comprising positioning the surface-processing device in a trailing orientation relative to the additive-manufacturing head.

16. The method of claim 12, wherein the second laser beam is directed to the at least one of the new layer of material or the existing layer of material using a mirror.

17. The method of claim 12, wherein the second laser beam has a polygonal cross-section.

18. The method of claim 12, further comprising a step of spacing the surface-processing device a predetermined distance from the product using a guide member.

19. The method of claim 18, wherein the guide member is a guide roller.

20. The method of claim 18, wherein:
    the guide member comprises a first guide roller and a second guide roller; and the step of spacing the surface-processing device the predetermined distance from the product comprises contacting an interior surface of the product with the first guide roller and contacting an exterior surface of the product with the second guide roller.

\* \* \* \* \*

UNITED STATES PATENT AND TRADEMARK OFFICE
CERTIFICATE OF CORRECTION

PATENT NO. : 10,882,291 B2
APPLICATION NO. : 15/688686
DATED : January 5, 2021
INVENTOR(S) : David Michael Dietrich et al.

Page 1 of 1

It is certified that error appears in the above-identified patent and that said Letters Patent is hereby corrected as shown below:

On the Title Page

Item [54] and in the Specification, Column 1, Lines 1-2, delete "ADDITIVE-MANUFACTURING SYSTEMS, APPARATUSES AND METHODS" and insert -- ADDITIVE-MANUFACTURING METHODS --, therefor.

Item [57], Line 1, delete "A method" and insert -- a method --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*